Feb. 13, 1962 JOHN K. LIU 3,020,990
TRANSMISSIONS
Filed July 7, 1958 3 Sheets-Sheet 1
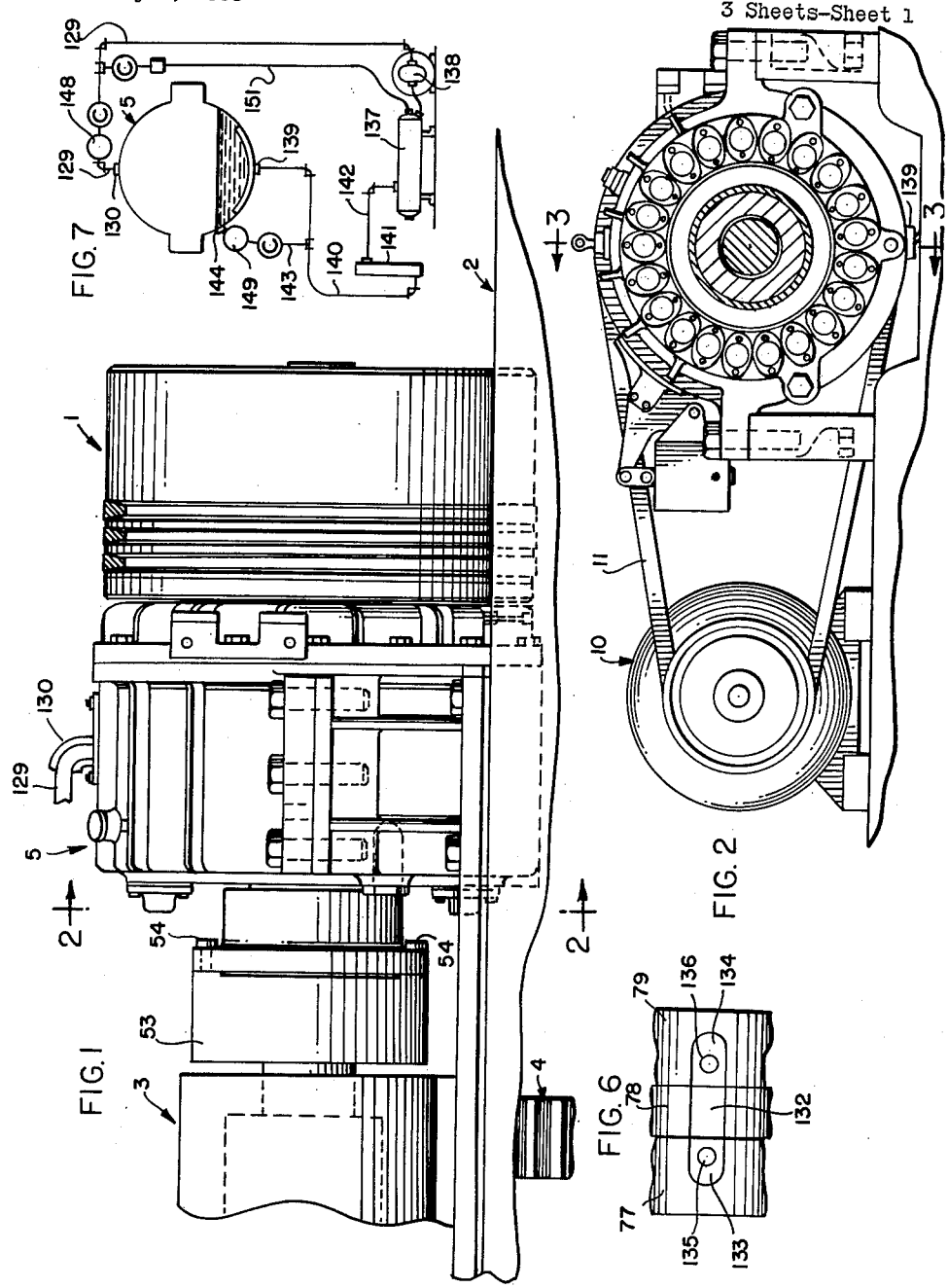
INVENTOR:
JOHN K. LIU
BY Marzall, Johnston, Cook & Root
ATT'YS

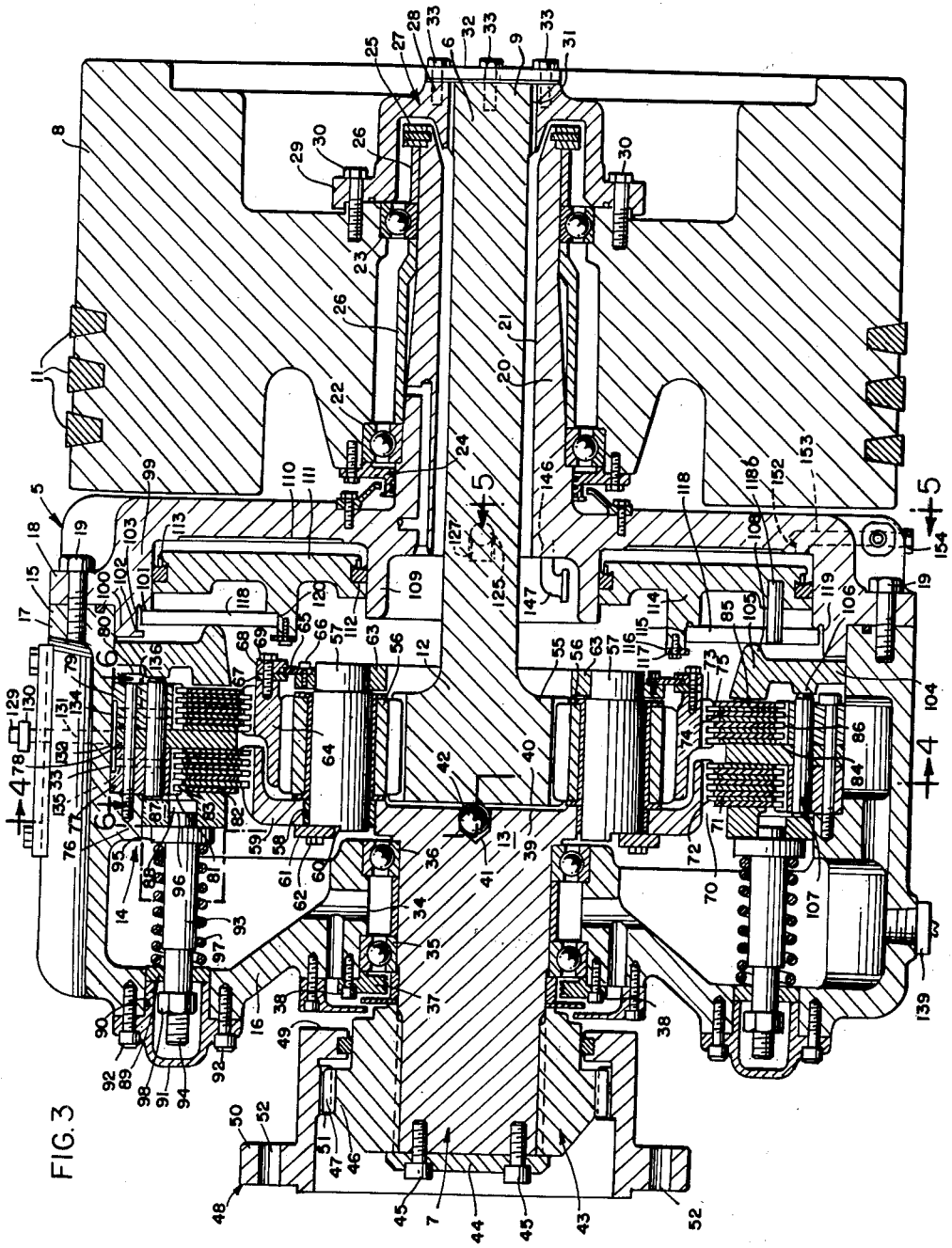

Feb. 13, 1962     JOHN K. LIU     3,020,990
TRANSMISSIONS

Filed July 7, 1958     3 Sheets-Sheet 3

INVENTOR.
JOHN K. LIU
ATT'YS

United States Patent Office 3,020,990
Patented Feb. 13, 1962

3,020,990
TRANSMISSIONS
John K. Liu, Chicago, Ill., assignor to U.S. Industries, Inc., New York, N.Y., a corporation of Delaware
Filed July 7, 1958, Ser. No. 746,984
12 Claims. (Cl. 192—4)

This invention relates to transmissions and, more particularly, to transmissions which are particularly well adapted for use on relatively heavy machinery such as, for example, mechanical metal drawing presses, and the like.

Transmissions of the general type to which this invention relates have been heretofore known in the art, but have commonly had inherent disadvantages such as, for example, being large and cumbersome in size; being inefficient and unreliable in operation; being subject to extensive breakage and wear; being difficult or impossible to cool when operated for prolonged periods of time; being complicated in construction and operation, or the like. It is a primary object of this invention to overcome such disadvantages.

Heretofore, heavy machinery which required transmissions such as, for example, mechanical metal drawing presses, and the like, have commonly embodied such transmissions in the machine as an integral part thereof. Such construction has meant that, in the event of a breakdown of the transmission, the entire machine would commonly be out of service during repair of the transmission. It is an important object of this invention to enable a novel transmission to be afforded which is in the form of an accessory for such machinery, which may be readily removed and replaced, so that in the event of a breakdown of the transmission, the latter may be quickly and easily removed and replaced, and the machine may be quickly put back in operation.

Another object of this invention is to afford a novel transmission embodying novel coupling mechanism for coupling and uncoupling two shafts.

A further object of this invention is to afford a novel transmission embodying a planetary gear system as a part of the mechanism thereof, and with the parts of the transmission constituted and arranged in a novel and expeditious manner.

Another object of this invention is to afford a novel transmission which may be cooled in a novel and expeditious manner.

An ancillary object is to afford a novel transmission wherein oil may be circulated therethrough, and the parts may be lubricated and cooled thereby.

Yet another object of this invention is to afford a novel transmission embodying novel actuating mechanism.

Another object is to afford a novel transmission embodying novel brake mechanism.

Yet another object of this invention is to provide a novel transmission embodying novel brake actuating mechanism constituted and arranged in a novel and expeditious manner.

A further object of this invention is to enable a novel transmission to be constructed in a manner whereby a drive shaft and a driven shaft may be disposed therein in longitudinal alignment with each other, and the driven shaft may be selectively coupled to, and uncoupled from, the drive shaft in a novel and expeditious manner.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a side elevational view of a transmission embodying the principles of the present invention, showing the transmission mounted in operative position on the top of a mechanical metal drawing press;

FIG. 2 is a sectional view taken substantially along the line 2—2 in FIG. 1;

FIG. 3 is a longitudinal sectional view through the transmission shown in FIGS. 1 and 2, taken substantially along the plane 3—3 in FIG. 2;

FIG. 6 is an enlarged detail sectional view taken substantially along the line 6—6 in FIG. 3; and FIG. 7 is a diagrammatic illustration of the cooling and lubricating system for the transmission shown in FIGS. 1 and 2.

Figure 4:
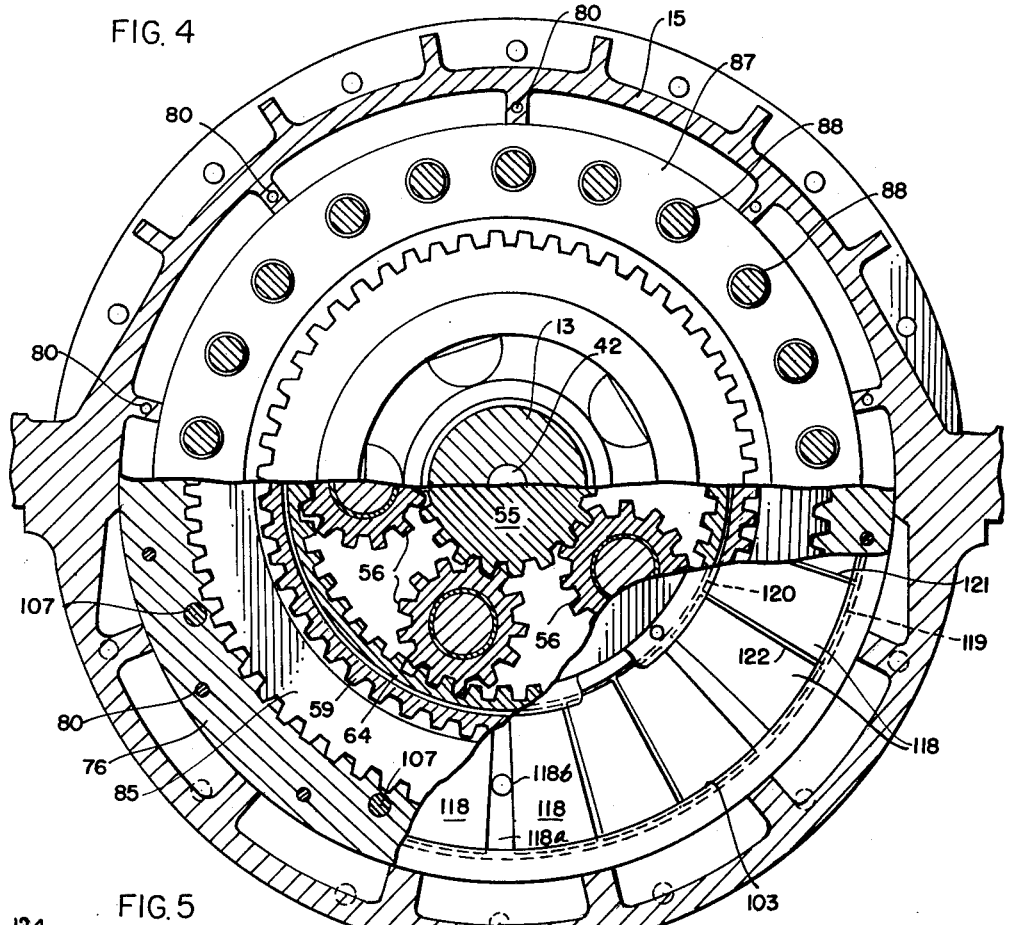
FIG. 4 is a transverse sectional view taken substantially along the line 4—4 in FIG. 3.

A transmission 1, embodying the principles of my invention, is shown in the drawings to illustrate the preferred embodiment of my invention.

In FIGS. 1 and 2, the transmission 1 is shown mounted on the top of a mechanical metal drawing press 2, and connected through a gear box 3 to a drive gear 4 of the press 2, to illustrate a typical installation of the type for which my novel transmission is particularly well adapted. It will be appreciated that the press 2 and the gear box 3 are shown merely by way of illustration and not by way of limitation, and that other installations and uses of my novel transmission may be made without departing from the purview of this invention.

In general, the transmission 1 embodies a housing 5 in which are journalled a drive shaft 6 and a driven shaft 7, in longitudinal alignment with each other, a flywheel 8 being mounted on the rear end portion 9 of the drive shaft 6, which projects outwardly of the housing 5, and the drive shaft 6 being adapted to be driven by suitable means such as a motor 10 connected to the flywheel 8 by a belt or belts 11, FIGS. 1, 2 and 3. The front end portion 12 of the drive shaft 6 is disposed in the housing 5 in closely adjacent, facing relation to the rear end portion 13 of the driven shaft 7, and my novel transmission 1 embodies novel coupling mechanism 14 for selectively connecting and disconnecting the axially aligned shafts 6 and 7, which will be discussed in greater detail presently.

Referring now in greater detail to the drawings, the housing 5 is substantially cylindrical in shape and embodies a tubular-shaped side wall portion 15 closed at its front end by a front wall 16. A radially outwardly projecting flange 17 is formed on the rear end portion of the side wall 15 of the housing 5, and the rear end of the housing 5 is closed by a rear end plate 18 removably secured to the flange 17 by suitable means such as bolts 19.

The rear end plate 18 has a tubular-shaped sleeve or hub 20 formed integrally therewith and projecting rearwardly from the central portion of the rear face thereof. An opening 21 extends through the rear end plate 18 axially of the sleeve 20.

The flywheel 8 is rotatably mounted on bearings 22 and 23 on the outwardly projecting portion of the sleeve 20 and is secured against displacement longitudinally of the sleeve 20 by an oil seal 24, mounted on the sleeve 20 between the rear end plate 18 and the front bearing 22, and a locknut 25 threaded onto the rear end portion of the sleeve 20, two spacer sleeves 26 being disposed between the bearings 22 and 23 and between the bearing 23 and the locknut 25, respectively.

A cap 27, having a rearwardly projecting centrally disposed hub portion 28, and a substantially radially outwardly projecting flange 29 is mounted on the rear of the flywheel 8 by bolts 30 extending through the flange 29 and threadedly engaged in the flywheel 8, with the hub 28 projecting into the sleeve 20. The drive shaft 6 extends through the sleeve 20, and the rearward extremity of the rear end portion 9 thereof projects rearwardly of the sleeve 20 into the hub 28 and is secured to the hub 28 for rotation thereby by splines 31, the outer peripheral surface of the shaft 6 being disposed in spaced relation to the inner peripheral surface of the sleeve 20. The cap 27 includes a rear end plate 32 secured to the rear face of the hub 28 by bolts 33.

The wall 16 of the housing 5 has a centrally disposed round opening 34 extending therethrough, and the driven shaft 7 extends longitudinally through the opening 34 and is journalled in bearings 35 and 36 therein, in longitudinal alignment with the drive shaft 6. An oil seal 37 is disposed on the outwardly projecting front end portion of the driven shaft 7, and is secured to the front face of the front end wall 16 by bolts 38. Hence, it will be seen that with the oil seals 24 and 37 disposed around the shafts 6 and 7, respectively, the shafts 6 and 7 are journalled in the housing 5 in a manner effective to prevent undesirable leakage of oil outwardly from the housing 5, while still permitting oil to flow outwardly from the housing 5 between the shaft 6 and the sleeve 20, and the shaft 7 and the opening 34, respectively, to lubricate the bearings 22 and 23 and the bearings 35 and 36, respectively, lubrication of my novel transmission 1 being afforded from within the housing 5 as will be discussed in greater detail presently.

The rear end face 39 of the driven shaft 7 and the front end face 40 of the drive shaft 6 are preferably disposed in closely adjacent, longitudinally spaced relation to each other. A recess 41 is formed in the rear end portion 13 of the driven shaft 7 on the longitudinal center line thereof, and a ball 42, made of suitable material such as, for example, steel, is rotatably mounted in the recess 41 and is of such size that it projects rearwardly from the rear face 39 of the driven shaft 7 into engagement with the center of the front face 40 of the drive shaft 6 to afford a thrust bearing between the shafts 6 and 7.

An annular-shaped coupling member 43 is splined to the front end portion of the driven shaft 7 in closely adjacent relation to the oil seal 37, and is held against forward displacement therefrom by a retaining plate 44 secured to the front end of the shaft 7 by bolts 45 and projecting radially outwardly of the shaft 7, FIG. 3. The coupling member 43 has an outwardly projecting, annular-shaped rib 46 extending around the front end portion thereof, and teeth 47 are formed therein.

A substantially tubular-shaped connecting member 48, having a radially inwardly projecting flange 49 on the rear end portion thereof, and a radially outwardly projecting flange 50 on the front end portion thereof, is mounted on the coupling member 43 with the rear end portion of the latter projecting rearwardly out through the flange 49. The connecting member 48 has internal teeth 51 formed thereon which mesh with the teeth 47 on the coupling member 43, and the flange 49 projects radially inwardly of the rib 46 so that the connecting member 48 is connected to the coupling member 43 for rotation therewith, and is secured against axial displacement from the coupling member 43.

The flange 50 on the connecting member 48 has a plurality of openings 52 extending therethrough, FIG. 3, and the connecting member 48 may be readily connected to the member to which my novel transmission 1 is to be connected, such as, for example, the shaft 53 in the gear box 3, FIG. 1, by bolts 54 extending through the openings 52 and threadedly engaged in the shaft 53.

A sun gear 55 is formed on the front end portion 12 of the drive shaft 6, and a plurality of planetary gears 56 are spaced therearound in meshing engagement therewith. Each of the planetary gears 56 is rotatably mounted on a respective pin 57 extending therethrough, each of the pins 57 being mounted in a respective opening 58 formed in a radially outwardly projecting flange or hub member 59 formed on the rearward extremity of the rear end portion 13 of the driven shaft 7. Each of the pins 57 has a radially outwardly facing shoulder 60 thereon, and a ring 61 is secured to the front face of the flange 59 by bolts 62 with the inner peripheral edge of the ring 61 abuttingly engaged with the shoulders 60 to thereby hold the pins 58 against rotation in the flange 59. The rear ends of the pins 57 are mounted in another annular-shaped hub member 63 which is secured to the flange 59 and the collar 61 by the bolts 62, the bolts 62 extending through the flange 59 and the hub members 61 and 63.

A ring gear 64 extends around the planetary gears 56 and is disposed in meshing engagement therewith. The ring gear 64 is held against displacement from assembled position longitudinally of the shafts 6 and 7 by a retaining ring 65 secured to the rear face of the hub member 63 by bolts 66, and having an outer peripheral edge portion disposed with a free running fit between the inner peripheral edge portions of two rings 67 and 68 secured to the rear face of the ring gear 64 by bolts 69.

Splines 70 are formed in the outer periphery of the hub member 59, FIGS. 3 and 4, and a plurality of annular-shaped brake discs 71 having splines 72 formed in the inner peripheral edge portion thereof are slidably mounted on the outer periphery of the hub member 59 for free sliding movement axially thereof, with the splines 72 engaged with the splines 70 to thereby operatively connect the brake discs 71 to the hub member 59 for rotation therewith.

Similarly, the ring gear 64 has splines 73 formed on the outer peripheral surface thereof, rearwardly of the hub member 51, and a plurality of annular-shaped brake discs 74, which are identical in construction to the brake discs 71, and have splines 75 formed in the inner peripheral surface thereof, are mounted on the ring gear 64 for free sliding movement axially thereof, with the splines 75 engaged with the splines 73 to thereby operatively connect the brake discs 74 for rotation with the ring gear 64.

A radially inwardly projecting flange or shoulder 76 is formed in the inner face of the side wall 15 of the housing 5, forwardly of the brake discs 71, and three ring members 77, 78 and 79 are clamped to the rear face of the shoulder 76 by bolts 80. The ring members 77 and 79 are disposed in juxtaposition to the front face and rear face of the ring member 78, respectively, and the bolts 80 extend through the ring members 77—79 and are threadedly engaged in the shoulder 76.

The ring members 77—79 have the same outside diameter and are disposed in the housing 5 in closely fitting relation to the inner surface of the side wall 15 thereof. The ring members 77 and 79 are identical in size and shape and terminate at their inner peripheral edges in outwardly spaced relation to the brake discs 71 and 74. The intermediate ring member 78 is of greater radial width than the outer ring members 77 and 79 and projects inwardly from the side wall 15 of the housing 5 past the inner peripheral edges of the ring members 77 and 79, and is disposed between the two groups of brake discs 71 and 74, respectively, for a purpose which will be discussed in greater detail presently.

The ring members 77 and 79 are so positioned in the housing 5 that they are disposed around the respective two groups of brake discs 71 and 74. The ring member 77 has splines 81 formed in the inner peripheral edge portion thereof, and a plurality of annular-shaped brake discs 82 having splines 83 formed on the inner peripheral edge portions thereof are slidably mounted in the ring 77 for free sliding movement axially thereof, with the splines 81 engaged with the splines 83 so that the brake discs 82 are non-rotatably mounted relative to the ring member 77 and, therefore, to the housing 5.

Similarly, the ring member 79 has a plurality of splines 84 formed in the inner peripheral edge portion thereof, FIGS. 3 and 4, and a plurality of annular-shaped brake discs 85 having splines 86 formed in the outer peripheral edge portion thereof are slidably mounted in the ring member 79 for free slidable movement axially thereof, with the splines 84 engaged with the splines 86 so that the brake discs 85 are non-rotatably mounted relative to the ring 79 and, therefore, relative to the housing 5.

The brake discs 82 are interleaved between the brake discs 71, with the front leaf of the assembled discs 71 and 82 being a stationary brake disc 82 and the rear leaf of the assembled discs 71 and 82 being a brake disc 71, which is rotatable with the hub member 59. The rear brake disc 71 is disposed between the rearwardmost brake disc 82 and the front face of the ring member 78 so that when the brake discs 71 and 82 are pressed together rearwardly, as will be discussed in greater detail presently, each of the brake discs 71 disposed forwardly of the rearwardmost brake disc 71 are clamped between a respective pair of stationary brake discs 82, and the rearwardmost brake disc 71 is clamped between the rearwardmost stationary brake disc 82 and the front face of the stationary ring member 78 to thereby afford an effective brake for holding the hub member 59, and, therefore, the driven shaft 7 against rotation.

Similarly, the stationary brake discs 85 are interleaved between the rotatable brake discs 74, with the rearwardmost brake disc of the brake disc assembly 74 and 85 being a stationary brake disc 85 and the forwardmost brake disc of the last mentioned assembly being a rotatable brake disc 74, which latter brake disc 74 is disposed between the forwardmost stationary brake disc 85 and the rear face of the stationary ring member 78. Thus, when the brake discs 74 and 85 are pressed together in a forward direction, each of the brake discs 74 disposed rearwardly of the forwardmost brake disc 74 is clamped between a respective pair of stationary brake discs 85 and the forwardmost brake disc 74 is clamped between the forwardmost stationary brake disc 85 and the rear face of the stationary ring member 78, to thereby afford an effective brake for holding the ring gear 64 against rotation.

Figure 5:
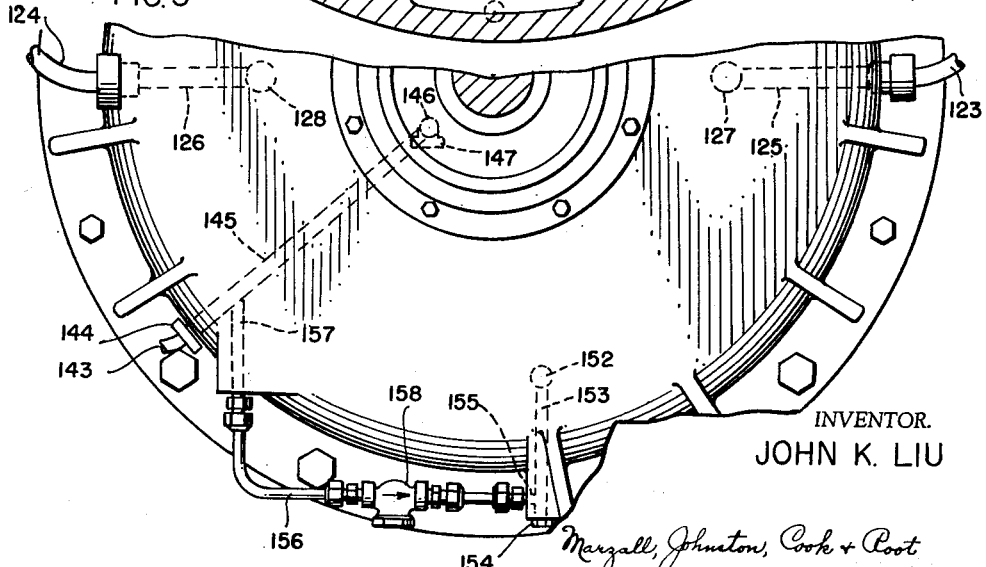
FIG. 5 is a sectional view taken substantially along the line 5—5 in FIG. 3.

A ring member 87 is slidably mounted in the shoulder 76 in the housing 5 forwardly of the ring 77, and has a plurality of round openings 88 formed therein, FIGS. 3 and 5. A plurality of plugs 89 are removably mounted in respective openings 90 in the front wall 16 of the housing 5 in axial alignment with respective ones of the openings 88. A plurality of cover members 91 are removably mounted in respective ones of the opening 90, and may be secured to the wall 16 by suitable means such as bolts 92. The cover members 91 are disposed in abutting engagement with the front face of the respective plugs 89 and are thereby effective to hold the plugs 89 against forward displacement in the respective openings 90.

A plurality of elongated plungers 93 extend through, and are slidably mounted in respective ones of the plugs 89 for horizontally slidable movement toward and away from the ring member 87, FIG. 3. Each of the plungers 93 has a threaded front end portion 94 and an enlarged head 95 on the rear end portion thereof, the head 95 being disposed in forwardly spaced relation to the rear end 96 of the respective plunger 93.

The plungers 93 are mounted in the housing 5 with the heads 95 thereon disposed in abutting engagement with the front face of the ring member 87, and with the rear ends 96 disposed in respective ones of the openings 88. A plurality of compression coil springs 97 are mounted on respective ones of the plungers 93 between the ring 87 and the plugs 89, and are effective to yieldingly urge the ring member 87 rearwardly toward the brake discs 71 and 82. Nuts 98 are threaded onto the front end portions 94 of the plungers 93 and afford means for readily adjusting the rearward limit of movement of the plungers 93 through the plugs 89, the nuts 98 engaging the front face of the plugs 89 when the plungers 93 have moved to the rearward limit of their reciprocation.

The rear end plate 18 is substantially cup-shaped in cross section, FIG. 3, and affords a cylinder 99 having a front end portion 100 projecting into the rear end portion of the side wall 15 of the housing 5, and terminating in rearwardly spaced relation to the ring member 79. A radially inwardly projecting shoulder 101 is disposed adjacent to the rear end of front end portion 100, and a radially inwardly projecting lip 102 is disposed at the front end of the front end portion 100 to afford an annular-shaped channel 103 in the cylinder 99 for a purpose which will be discussed in greater detail hereinafter.

A ring member 104 having a forwardly projecting inner edge portion 105, and a forwardly projecting annular rib 106 disposed between the inner and outer peripheral edges of the ring 104, is slidably mounted in the housing 5, forwardly of the cylinder 99 for free sliding movement axially of the housing 5. The ring member 104 is of such size that the inner edge portion 105 thereof is disposed directly rearwardly of the rearwardmost stationary ring member 85 in such position that when the ring member 104 is moved forwardly, it is effective to press the brake discs 74 and 85 forwardly against the ring member 78.

A plurality of pins 107 extend horizontally through the ring members 77—79, radially outwardly of the splines 81 and 84, and radially inwardly of the shoulder 101 directly forwardly of the rib 106. The pins 107 are of somewhat greater length than the combined widths of the ring members 77—79, and are disposed in such position directly rearwardly of the outer peripheral edge portion of the ring member 87 that when the ring member 104 is moved forwardly into position to push the pins 107 forwardly through the ring members 77—79, the pins 107 are effective to move the ring member 87 forwardly against the urging of the springs 97 away from the brake discs 71 and 82 to thereby free the hub member 59 and, therefore, the driven shaft 7 for rotation in the housing 5.

The ring member 104 also embodies an annular-shaped rib 108 projecting rearwardly from the rear face thereof for a purpose which will be discussed in greater detail presently.

A sleeve 109, which is of substantially smaller outside diameter than the inside diameter of the cylinder 99 is integrally formed with, and projects forwardly from the central portion of the inner face of the rear end plate 18 of the housing 5 within the cylinder 99. An annular-shaped recess 110, which extends around the drive shaft 6 and the sleeve 109, is formed in the front face of the rear end plate 18 of the housing 5.

An annular-shaped piston 111 is slidably mounted on the outer periphery of the sleeve 109 within the cylinder 99, the inner and outer peripheries of the piston 111 engaging the outer periphery of the sleeve 109 and the inner peripheral surface of the cylinder 99 with a snug, but freely slidable fit, so that the piston 111 is freely axially slidable on the sleeve 109 within the cylinder 99. Sealing rings 112 and 113, made of suitable material such as, for example, suitable polymerized chloroprene rubber, such as that commonly known as neoprene, are mounted in the inner and outer peripheries of the piston 111 and engage the sleeve 109 and the cylinder 99 to afford an effective seal against the leakage of oil and air past the piston 111. An annular-shaped rib 114 projects forwardly from the front face of the piston 111 in spaced, encircling relation to the drive shaft 6, and the forward outer peripheral edge portion thereof is cut away to form a recess 115 therearound. A ring 116 is secured to the front face of the rib 114 by bolts 117 and projects radially outwardly from the rib 114 to afford a front wall for the recess 115.

A plurality of levers 118, preferably in the form of segments of a flat annular-shaped plate or ring member, FIGS. 3 and 4, are mounted in closely adjacent relation to each other around the rib 114 and project radially outwardly from the rib 114. Each of the levers 118 has an arcuate-shaped outer peripheral edge portion 119, an inner arcuate-shaped peripheral edge portion 120, which is concentric to the outer peripheral edge portion 119, and two side edges 121 and 122 which diverge outwardly from each other from the inner edge 120 to the outer edge 119 at a suitable angle such as, for example, at an angle of approximately fifteen degrees.

The levers 118 are mounted on the rib 114 with the inner edges 120 thereof disposed in the recess 115 with a loose fit, and project substantially radially outwardly from the recess 115. The outer end portions of the levers 118 are disposed in the channel 101 in the cylinder 99 with a relatively loose fit. The levers or ring segments 118 are of such length, between the outer peripheral edge 119 and the inner peripheral edge 120, that they fit between the rib 114 and the cylinder 99 with a fit which is loose enough to permit the levers 118 to swing forwardly and backwardly relative to the cylinder 99, with the upper edge portions of the rear faces of the levers 118 disposed in abutting engagement with the shoulder 101, during reciprocation of the piston 111 and the cylinder 99 relative to each other, but the fit being tight enough that the levers 118 cannot move relative to the rib 114 and the cylinder 99 a sufficient distance to permit the levers 118 to fall free therefrom.

The levers 118 are of such width that, when they are disposed in normal abutting side-by-side relation, they do not form a complete circle, a space 118a, FIG. 4, being left between two of the levers 118. A pin 118b, FIGS. 3 and 4, is mounted in the piston 111 with a press fit and projects forwardly into the space 118a. The pin 118b is of such cross-sectional size that it fits between the adjacent levers 118 with a snug fit and serves to orient the levers 118 relative to the piston 111 and the cylinder 99.

The levers 118 are disposed between the ring member 104 and the shoulder 101 in the cylinder 99, with the intermediate portion of the front face of each of the levers 118 disposed in abutting engagement with the rear face of the rib 108 on the ring member 104, and with the outer peripheral edge of the rear face of each of the levers 118 disposed in abutting engagement with the shoulder 101 of the cylinder 99.

When the piston 111 is disposed in its rearwardmost position in the cylinder 99, sufficient distance is afforded between the levers 118 and the assembly of brake discs 74 and 85 that the springs 97, acting through the ring member 87 and the pins 107 are effective to hold the ring member 104 rearwardly of the brake discs 74 and 85 a sufficient distance that the brake discs 74 and 85 a sufficient distance that the brake discs 74 and 85 are free to rotate relative to each other. This is the normal position of the piston 111. Hence, it will be seen that the ring gear 64 is normally freely rotatable in the housing 5.

However, when the piston 111 is moved forwardly from the aforementioned normal position thereof, it is effective through the engagement of the rib 114 with the inner peripheral edges of the levers 118, to pivot the levers 118 forwardly around the shoulder 101. This forward movement of the levers 118 is effective, through their abutting engagement with the rib 108 on the ring member 104 to slide the ring member 104 forwardly in the housing 5 into position effective to push the pins 107 forwardly a sufficient amount to release the ring member 87 from its clamping relation to the brake discs 71 and 82, and thereby free the hub member 59 and, therefore, the driven shaft 7, for rotation. At the same time, this forward movement of the ring member 104 is effective to press the inner peripheral edge portion 105 thereof forwardly against the rearwardmost brake disc 85 with sufficient force to clamp the assembly of brake discs 74 and 85 forwardly against the ring member 78 and thereby stop rotation of the ring gear 64.

With this construction, when the piston 111 is disposed in its normal position in the cylinder 99, the springs 97 are effective to urge the ring member 87 rearwardly in the housing 5 into position wherein the assembly of brake discs 71 and 82 are clamped between the ring members 87 and the ring members 78 to thereby hold the hub member 59 and the driven shaft 7 from rotation, the ring member 104, at this time, being held by the pins 107 rearwardly of the brake discs 74 and 85 in such position that the brake discs 74 and, therefore, the ring gear 64 are free to rotate relative to the brake discs 85.

However, with the parts of my novel transmission 1 constituted and arranged in the manner disclosed herein, when the piston 111 is moved forwardly from its aforementioned normal position to fully actuated forward position, it is effective to clamp the brake discs 74 and 85 together and, thereby, stop the rotation of the ring gear 64 and, at the same time, to free the brake discs 71 for rotation relative to the brake discs 82 to thereby free the hub member 59 and the driven shaft 7 for rotation.

Two pipes or tubes 123 and 124 are mounted in the outer end portions of two horizontally extending, diametrically opposed passageways 125 and 126, respectively, formed in the rear end plate 18, FIGS. 3 and 4. The inner end portions of the passageways 125 and 126 terminate in radially outwardly spaced relation to the sleeve 109, and two passageways 127 and 128 extend forwardly from the inner end portions thereof into communication with the recess 110 formed in the front face of the rear end plate 18. Air under pressure may be fed from a suitable source of supply, not shown, through the conduits 123, 125 and 127, and the conduits 124, 126 and 128, into the recess 110 to thereby cause the aforementioned forward movement of the piston 111 in the operation of my novel transmission 1.

A suitable pipe or tube 129 is connected by a nipple 130 to the upper end portion of a passageway 131 which extends through the top of the housing 5 directly above the ring member 78, FIGS. 1, 2 and 3. The top of the ring member 78 has a notch or recess 132 formed therein and extending thereacross, FIGS. 3 and 6, in communication with the passageway 131. Two recesses 133 and 134 are formed in the tops of the ring members 77 and 79, respectively, and are disposed in communication with the recess 131. Each of the ring members 77 and 79 have passageways 135 and 136 extending downwardly therethrough from the recesses 133 and 134, respectively.

For lubrication and cooling of my novel transmission 1, oil may be fed from a suitable source of supply such as a tank 137, by a pump 138, FIG. 7, through the conduit or pipe 129 and discharged downwardly through the nipple 130 into the top of the housing 5 from which it pours downwardly through the passageways 131—136 onto the discs 71, 74, 82 and 85 and over the parts of my novel transmission 1 disposed in the housing 5, FIGS. 3 and 6. Another nipple 139 is mounted in the lowermost portion of the side wall 15 of the housing 5, FIGS. 2, 3 and 7, and may be connected by a suitable conduit 140 to a suitable cooling device such as a radiator 141. The radiator 141 is connected by a pipe 142 to the tank 137. Thus it will be seen that oil may be fed from the bottom of the housing 5 back to the tank 137 in cooled condition for recirculating by the pumps 138 to the housing 5.

Another pipe or conduit 143 is connected by a nipple 144 to the outer end portion of a passageway 145 extending through the end plate 18, FIG. 5. The inner end portion of the passageway 145 is in communication with a passageway 146 which opens forwardly into the cylinder 99, below the drive shaft 6, a suitable inlet conduit such as an elbow 147 being mounted in the front end portion of the passageway 146 between the drive shaft 6 and the sleeve 109, FIGS. 3 and 5.

The other end of the pipe 143 is connected to the conduit 140 and, thus, to the radiator 141 and the tank 137, so that when the oil level in the housing 5 rises to the level of the discharge conduit 147, oil may flow therethrough back to the tank 137.

The pipes 129, 140 and 143, and the aforementioned oil passageways in the housing 5 are preferably of such relative size that a larger amount of oil may be pumped through the pipe 129 into the housing 5 than may flow by gravity downwardly through the nipple 139 back to the tank 137, so that the oil level in the housing 5 may be built up when the pump 138 is operating even though the conduit 140 is open and is draining oil from the bottom of the housing 5. The pipes and passageways, however, should be of such relative size as to insure that when the level of oil in the housing 5 reaches the discharge conduit 147, it will not be permitted to rise above that level.

If desired, thermometers such as the thermometers indicated at 148 and 149 in FIG. 7 may be installed in the pipes 129 and 143, respectively, to afford a ready check on the temperature of the oil flowing into and out of the housing 5. Also, valves such as, for example, suitable globe valves 150 may be installed in the lines 129 and 143 for controlling the flow of oil therethrough, and a pressure relief line 151 may be inserted between the line 129 and the tank 137 to protect against excessive pressures in the line 129.

It will be seen that in the operation of my novel transmission 1, when the oil level has risen in the housing 5 to the level of the discharge conduit 147, the ring gear 64, the hub member 59 and the brake discs 71 and 84, during the rotation thereof, rotate through the oil in the bottom of the housing 5 and thereby act as splash rings to throw the oil upwardly into the housing 5 and bathe all parts therein in oil. This bathing of the parts of the transmission 1, together with the flow of oil downwardly over those parts from the nipple 130, affords effective lubrication therefor and in addition, affords effective cooling, the oil being constantly withdrawn from the bottom of the housing 5 and fed through a suitable cooling device before being returned to the housing 5.

It will be noted that with this construction, the oil fed to the transmission 1 may be fed from a suitable source of supply closely adjacent thereto or, if desired, may be fed from a source of supply which is remote therefrom such as, for example, a central pumping and cooling system for a plurality of such transmissions.

It will be noted that the particular oil system shown in FIG. 6 hereof is merely by way of illustration, and not by way of limitation and that other systems, which may differ therefrom in details of construction, may be used for feeding the oil into the housing 5 and removing it therefrom without departing from the purview of my invention.

In the preferred embodiment of my novel transmission 1, shown in the drawings, I have embodied a passageway 152 in the rear end plate 18, which extends rearwardly from the lower edge portion of the cylinder 99, FIGS. 3 and 5, and connects to a downwardly extending passageway 153 which opens outwardly through the bottom of the rear end plate 18. The lower end of the passageway 153 is normally closed by a plug 154, but the plug may be removed, when desired, to drain any oil which may have accumulated in the cylinder 99 rearwardly of the piston 111.

Another passageway 155 is formed in the rear end plate 18 and connects at one end with the lower end portion of the passageway 153, FIG. 5. The other end of the passageway 155 is connected by a suitable conduit 156 to the lower end of a passageway 157, the upper end of which connects with the passageway 145. A one-way check valve 158 is mounted in the conduit 156 in position to permit the flow of oil from the passageway 145 to the passageway 153.

From the foregoing it will be seen that in the operation of my novel transmission 1, the transmission 1 may be mounted in suitable operable position such as, for example, on top of the press 2, and the front end portion of the driven shaft 7 may be operably connected to the mechanism which it is intended to drive such as, the shaft 53 of the gear unit 3 on the press 2. Thereafter, with the piston 111 in normal position, the motor 10 may be started to thereby rotate the flywheel 8 and the drive shaft 6 of the transmission 1. During this initial rotation of the drive shaft 6, the driven shaft 7 is held stationary by the brake discs 71 and 82 and the ring gear 64 is free to rotate around the sun gear 55.

When it is desired to couple the driven shaft 7 to the drive shaft 6 for rotation thereby, air may be fed inwardly through the passageways 123, 125 and 127, and 124, 126 and 128, into the recess 110 to thereby move the piston 111 forwardly in the cylinder 99. This movement of the piston 111 forwardly is effective to stop the rotation of the brake discs 74 and, therefore, the ring gear 64, and to release the brake discs 71, the hub member 59, and the driven shaft 7 for rotation, as previously described. Hence, with the ring gear 64 stopped, the planetary gears 56 advance around the ring gear 64 in the same direction as the direction of rotation of the sun gear 55 on the drive shaft 6, but at a reduced rate of speed, to thereby rotate the driven shaft 7 and drive the mechanism connected thereto such as, for example, the shaft 53 and the drive gear 4 at a reduced rate of speed.

When it is desired to again uncouple the driven shaft 7 from the drive shaft 6, the air may be vented from the recess 110 outwardly through the passageways 123—128 to thereby free the piston 111 for return movement to normal position under the urging of the springs 97, this return movement of the piston 111 being effective to again release the ring gear 64 for rotation and to stop the rotation of the hub member 59 and the driven shaft 7.

From the foregoing, it will be seen that I have afforded a novel wet transmission which is relatively simple in construction.

Also, I have afforded a novel transmission which is effective and efficient in operation and which may be readily and economically produced commercially.

In addition, it will be seen that I have afforded a novel transmission which may be efficiently and effectively cooled even over prolonged periods of operation.

Also, I have afforded a transmission, the parts of which are well lubricated and are subject to relatively little shock or wear.

Also, I have afforded a novel transmission which may be quickly and easily installed as an accessory to a machine for the purpose of driving the machine.

In addition, it will be seen that I have afforded a novel transmission embodying braking means constituted and arranged in a novel and expeditious manner.

Also, it will be seen that I have afforded novel actuating means for braking means.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a transmission including supporting means, a drive shaft rotatably mounted in said supporting means, a driven shaft rotatably supported in said supporting means, means for rotating said drive shaft, brake means for holding said driven shaft against rotation, and means for connecting said driven shaft to said drive shaft for rotation thereby, means for simultaneously actuating said brake means and said connecting means to thereby simultaneously engage said brake means and disengage said connecting means, and disengage said brake means and engage said connecting means, respectively, said actuating means including a plurality of lever members disposed in side by side relation to each other around a circle, said lever members being simultaneously movable axially of said circle into and out of position to so actuate said brake means and said connecting means, and means in said supporting means for moving said lever members into and out of said position.

2. A transmission comprising drive means, driven means, means movable into position to couple said drive means and said driven means together, and means for moving said coupling means, said moving means comprising two abutment means, a plurality of levers disposed around a common axis in uniplanar spaced relation to each other between said two abutment means, each of said levers having inner and outer peripheral edge portions, one of said abutment means being disposed in abutting engagement with one of said edge portions of said levers, the other of said abutment means being normally stationary and being reciprocable along a path of travel into and out of predetermined position to move said coupling means into and out of said first mentioned position, spring means disposed in position to move said other abutment means in one direction along said path of travel, and means engaged with said levers in position to move said levers relative to said one abutment means into position to push said other abutment means in the other direction along said path of travel into said predetermined position.

3. A transmission comprising drive means, driven means, means movable into position to operatively couple said drive means and said driven means together, and means for moving said coupling means, said moving means comprising two abutment means, a plurality of levers disposed around a common axis in uniplanar spaced relation to each other between said two abutment means, each of said levers having inner and outer peripheral edge portions, one of said abutment means being stationary and being normally disposed in abutting engagement with one of said edge portions of said levers, the other of said abutment means comprising a normally stationary ring member extending around said axis and reciprocable therealong into and out of a predetermined position wherein said ring member is effective to move said coupling means into said first mentioned position, spring means disposed in position to urge said ring member in one direction along said axis, said ring member having an annular-shaped boss extending around said axis and projecting into engagement with said levers on the other side of the latter from said one abutment means, and means engaged with said levers in position to pivot said levers around said one abutment means toward said ring member to thereby push said ring member in the other direction along said axis into said predetermined position.

4. In a transmission including a housing, a shaft journalled in said housing and having one end portion projecting outwardly therefrom, another shaft journalled in said housing and having one end portion projecting outwardly therefrom, said shafts being disposed in longitudinal alignment with each other with the other ends thereof disposed in facing relation to each other within said housing, coupling means in said housing including one normally engaged brake means and another normally disengaged brake means, said first mentioned shaft being normally held against rotation by said normally engaged brake means, said coupling means being operative to couple said first mentioned shaft to said other shaft for rotation thereby upon disengagement of said normally engaged brake means and engagement of said normally disengaged brake means, and means on said other shaft for rotating the latter, control means for simultaneously disengaging said normally engaged brake means and engaging said normally disengaged brake means to thereby operatively couple said first mentioned shaft to said other shaft for rotation thereby, said control means comprising actuating means movable into predetermined position to simultaneously disengage said normally engaged brake means and engage said normally disengaged brake means, a plurality of levers mounted in said housing in position to move said actuating means into said predetermined position upon actuation of said levers, and means in said housing for actuating said levers to thereby move said actuating means to said predetermined position.

5. In a transmission including a housing, a shaft journalled in said housing and having one end portion projecting outwardly therefrom, another shaft journalled in said housing and having one end portion projecting outwardly therefrom, said shafts being disposed in longitudinal alignment with each other with the other ends thereof disposed in facing relation to each other within said housing, coupling means in said housing including one normally engaged brake means, and another normally disengaged brake means, said first mentioned shaft being normally held against rotation by said normally engaged brake means, said coupling means being operative to couple said first mentioned shaft to said other shaft for rotation thereby upon disengagement of said normally engaged brake means and engagement of said normally disengaged brake means, and means on said other shaft for rotating the latter, control means for simultaneously disengaging said normally engaged brake means and engaging said normally disengaged brake means to thereby operatively couple said first mentioned shaft to said other shaft for rotation thereby, said control means comprising actuating means movable into predetermined position to simultaneously disengage said normally engaged brake means and engage said normally disengaged brake means, a plurality of elongated levers disposed in side by side relation in said housing as radii of a circle, said levers being engaged with said actuating means, and means for moving said levers toward said actuating means into position to move said actuating means into said predetermined position.

6. In a transmission including a housing, a shaft journalled in said housing and having one end portion projecting outwardly therefrom, another shaft journalled in said housing and having one end portion projecting outwardly therefrom, said shafts being disposed in longitudinal alignment with each other with the other ends thereof disposed in facing relation to each other within said housing, coupling means in said housing including one normally engaged brake means, and another normally disengaged brake means, said first mentioned shaft being normally held against rotation by said normally engaged brake means, said coupling means being operative to couple said first mentioned shaft to said other shaft for rotation thereby upon disengagement of said normally engaged brake means and engagement of said normally disengaged brake means, and means on said other shaft for rotating the latter, control means for simultaneously disengaging said normally engaged brake means and engaging said normally disengaged brake means to thereby operatively couple said first mentioned shaft to said other shaft for rotation thereby, said control means comprising actuating means movable into predetermined position to simultaneously disengage said normally engaged brake means and engage said normally disengaged brake means, a plurality of elongated levers disposed in side by side relation in said housing as radii of a circle, said levers having inner and outer end portions, and intermediate portions disposed between said end portions and abuttingly engaged with said actuating means, and means in said housing engaged with one of said end portions and an intermediate portion of said levers and movable into position to pivot said levers around the other of said end portions into position to push said actuating means into said predetermined position.

7. A transmission comprising a housing, a shaft journalled in said housing and having one end portion projecting outwardly therefrom, another shaft journalled in said housing and having one end portion projecting outwardly therefrom, said shafts being disposed in longitudinal alignment with each other with the other ends thereof disposed in facing relation to each other within said housing, coupling means in said housing including one normally engaged brake means, and another normally disengaged brake means, said first mentioned shaft being normally held against rotation by said normally engaged brake means, said coupling means being operative to couple said first mentioned shaft to said other shaft for rotation thereby upon disengagement of said normally engaged brake means and engagement of said normally disengaged brake means, means on said other shaft for rotating the latter, and control means for simultaneously disengaging said normally engaged brake means and engaging said normally disengaged brake means to thereby operatively couple said first mentioned shaft to said other shaft for rotation thereby, said control means comprising actuating means movable into predetermined position to simultaneously disengage said normally engaged brake means and engage said normally disengaged brake means, a plurality of elongated levers disposed in side by side relation in said housing as radii of a circle, said levers having inner and outer ends portions, and intermediate portions disposed between said end portions and abuttingly engaged with said actuating means, a shoulder in said housing abuttingly engaging said outer end portions of said levers on the opposite side of said levers from said actuating means, a piston movably mounted in said housing on the opposite side of said levers from said actuating means and having a hub portion supportingly engaging said inner end portions of said levers and movable with the remainder of said piston, a pin on said piston and disposed between two of said levers in wedging engagement therewith, and means for feeding working fluid to said piston to thereby move said piston toward said actuating means to pivot said levers around said shoulder into position to push said actuating means into said predetermined position.

8. A transmission comprising a housing, a shaft journalled in said housing and having one end portion projecting outwardly therefrom, another shaft journalled in said housing and having one end portion projecting outwardly therefrom, said shafts being disposed in longitudinal alignment with each other with the other ends thereof disposed in facing relation to each other within said housing, coupling means in said housing including one normally engaged brake means, and another normally disengaged brake means, said first mentioned shaft being normally held against rotation by said normally engaged brake means, said coupling means being operative to couple said first mentioned shaft to said other shaft for rotation thereby upon disengagement of said normally engaged brake means and engagement of said normally disengaged brake means, means on said other shaft for rotating the latter, said coupling means including a sun gear mounted on the inner end portion of said other shaft and rotatable therewith, a ring gear extending around said sun gear, a carrier mounted on said first mentioned shaft and rotatable therewith, and planetary gears rotatably mounted on and carried by said carrier in meshing engagement with said sun gear and said ring gear, said normally engaged brake means including means in said housing normally holding said carrier against rotation, said normally disengaged brake means including means in said housing for holding said ring gear against rotation when said first mentioned shaft is so coupled to said other shaft, and control means for simultaneously disengaging said normally engaged brake means and engaging said normally disengaged brake means to thereby operatively couple said first mentioned shaft to said other shaft for rotation thereby.

9. A transmission comprising a housing, a shaft journalled in said housing and having one end portion projecting outwardly therefrom, another shaft journalled in said housing and having one end portion projecting outwardly therefrom, said shafts being disposed in longitudinal alignment with each other with the outer ends thereof disposed in facing relation to each other within said housing, coupling means in said housing including one normally engaged brake means, and another normally disengaged brake means, said first mentioned shaft being normally held against rotation by said normally engaged brake means, said coupling means being operative to couple said first mentioned shaft to said other shaft for rotation thereby upon disengagement of said normally engaged brake means and engagement of said normally disengaged brake means, means on said other shaft for rotating the latter, said coupling means including a sun gear mounted on the inner end portion of said other shaft and rotatable therewith, a ring gear extending around said sun gear, a carrier mounted on said first mentioned shaft and rotatable therewith, and planetary gears rotatably mounted on and carried by said carrier in meshing engagement with said sun gear and said ring gear, said normally engaged brake means including means in said housing normally holding said carrier against rotation, said normally disengaged brake means including means in said housing for holding said ring gear against rotation when said first mentioned shaft is so coupled to said other shaft, and control means for simultaneously disengaging said normally engaged brake means and engaging said normally disengaged brake means to thereby operatively couple said first mentioned shaft to said other shaft for rotation thereby, said control means comprising actuating means movable into predetermined position to simultaneously disengage said normally engaged brake means and engage said normally disengaged brake means, a plurality of elongated levers disposed in side by side relation in said housing as radii of a circle, said levers being engaged with said actuating means, and means for moving said levers toward said actuating means into position to move said actuating means into said predetermined position.

10. A transmission comprising a closed housing, means for circulating oil through said housing and maintaining said housing filled with said oil to a predetermined level, a drive shaft, means for rotating said drive shaft, a driven shaft, said shafts being journalled in said housing in horizontally extending longitudinal alignment with each other above said oil level, said shafts extending outwardly through said housing, means sealing said shafts to said housing against oil leakage therebetween, brake discs non-rotatably mounted in said housing and extending around said shafts, a sun gear mounted on the inner end portion of said drive shaft within said brake discs, a ring gear rotatably mounted in said housing within said brake discs and in encircling relation to said sun gear, said ring gear having a plurality of other brake discs extending radially outwardly therefrom and rotatable therewith, said other brake discs being movable into and out of engagement with said first mentioned brake discs for thereby holding said ring gear against, and freeing said ring gear for, rotation, respectively, a carrier projecting radially outwardly from and rotatably with said driven shaft, planetary gears rotatably mounted on and carried by said carrier in meshing engagement with said sun gear and ring gear, said carrier having a plurality of additional brake discs extending radially outwardly therefrom and rotatable therewith, said additional brake discs being movable into and out of engagement with said first mentioned brake discs for thereby holding said driven shaft from, and freeing said driven shaft for rotation, respectively, and means for controlling the engagement of said other and additional brake discs with said first mentioned brake discs to thereby control coupling and uncoupling of said driven shaft to said drive shaft for rotation thereby.

11. A transmission as defined in claim 10, and in which said control means comprises spring means normally urging said additional brake discs into engagement with said first mentioned brake discs, means, including a ring member, mounted in said housing and operable upon movement of said ring member into predetermined position to move said additional brake discs out of engagement with said first mentioned brake discs and move said other brake discs into engagement with said first mentioned brake discs, a plurality of levers projecting radially outwardly relative to said drive shaft in spaced relation therearound in engagement with said ring member, and means extending around said drive shaft in position to move said levers and thereby move said ring member into said predetermined position.

12. A transmission comprising a housing, a shaft journalled in said housing and having one end portion projecting outwardly therefrom, another shaft journalled in said housing and having one end portion projecting outwardly therefrom, said shafts being disposed in longitudinal alignment with each other with the other ends thereof disposed in facing relation to each other within said housing, a sun gear mounted on said other end portion of said other shaft, a ring gear rotatably mounted in said housing around said sun gear, a carrier mounted on said other end portion of said first mentioned shaft and rotatable therewith, brake discs non-rotatably mounted in said housing, other brake discs mounted on said carrier and rotatable therewith, additional brake discs mounted on said ring gear and rotatable therewith, spring means normally holding said other brake discs in operative engagement with said first mentioned brake discs to thereby hold said carrier and said first mentioned shaft against rotation, said additional brake discs being normally disengaged from said first mentioned brake discs and being movable into operative engagement therewith to then hold said ring gear against rotation in said housing, and control means for simultaneously disengaging said other brake discs from said first mentioned brake discs and engaging said additional brake discs with said first mentioned brake discs to thereby operatively couple said first mentioned shaft to said other shaft for rotation thereby, said control means comprising a plurality of pins extending through said first mentioned brake discs in position to move said spring means into position to release said other brake discs from said first mentioned brake discs upon longitudinal movement of said pins in one direction, a ring member movably mounted in said housing in position to move said pins in said one direction and to move said additional brake discs into engagement with said first mentioned brake discs upon movement of said ring member into a predetermined position, abutment means in said housing, a piston slidably mounted in said housing for movement toward and away from said ring member, and a plurality of ring segments mounted on a portion of said piston in radially outwardly projecting relation to said portion, said ring segments having outer peripheral edge portions normally disposed in abutting engagement with said abutment means, and inner peripheral edge portions engaged with said portion of said piston in position whereby, upon movement of said piston toward said ring member, said ring segments are moved thereby relative to said abutment means into position to move said ring member into said predetermined position.

References Cited in the file of this patent
UNITED STATES PATENTS

| | | |
|---|---|---|
| 1,878,379 | Church | Sept. 20, 1932 |
| 2,720,298 | Youngren et al. | Oct. 11, 1955 |
| 2,720,866 | Maki et al. | Oct. 18, 1955 |
| 2,806,568 | Bliss | Sept. 17, 1957 |
| 2,815,974 | Stubbe | Dec. 10, 1957 |
| 2,836,270 | Leopold | May 27, 1958 |
| 2,862,589 | Porteous et al. | Dec. 2, 1958 |
| 2,870,655 | Rockwell | Jan. 27, 1959 |
| 2,880,835 | Hass | Apr. 7, 1959 |

FOREIGN PATENTS

| | | |
|---|---|---|
| 829,074 | France | Mar. 7, 1938 |

UNITED STATES PATENT OFFICE
CERTIFICATE OF CORRECTION

Patent No. 3,020,990                February 13, 1962

John K. Liu

It is hereby certified that error appears in the above numbered patent requiring correction and that the said Letters Patent should read as corrected below.

Column 6, lines 24 and 25, for "silding" read -- sliding --; column 7, lines 58 and 59, strike out "a sufficient distance that the brake discs 74 and 85".

Signed and sealed this 5th day of June 1962.

SEAL)
Attest:

ERNEST W. SWIDER
Attesting Officer

DAVID L. LADD
Commissioner of Patents